United States Patent Office.

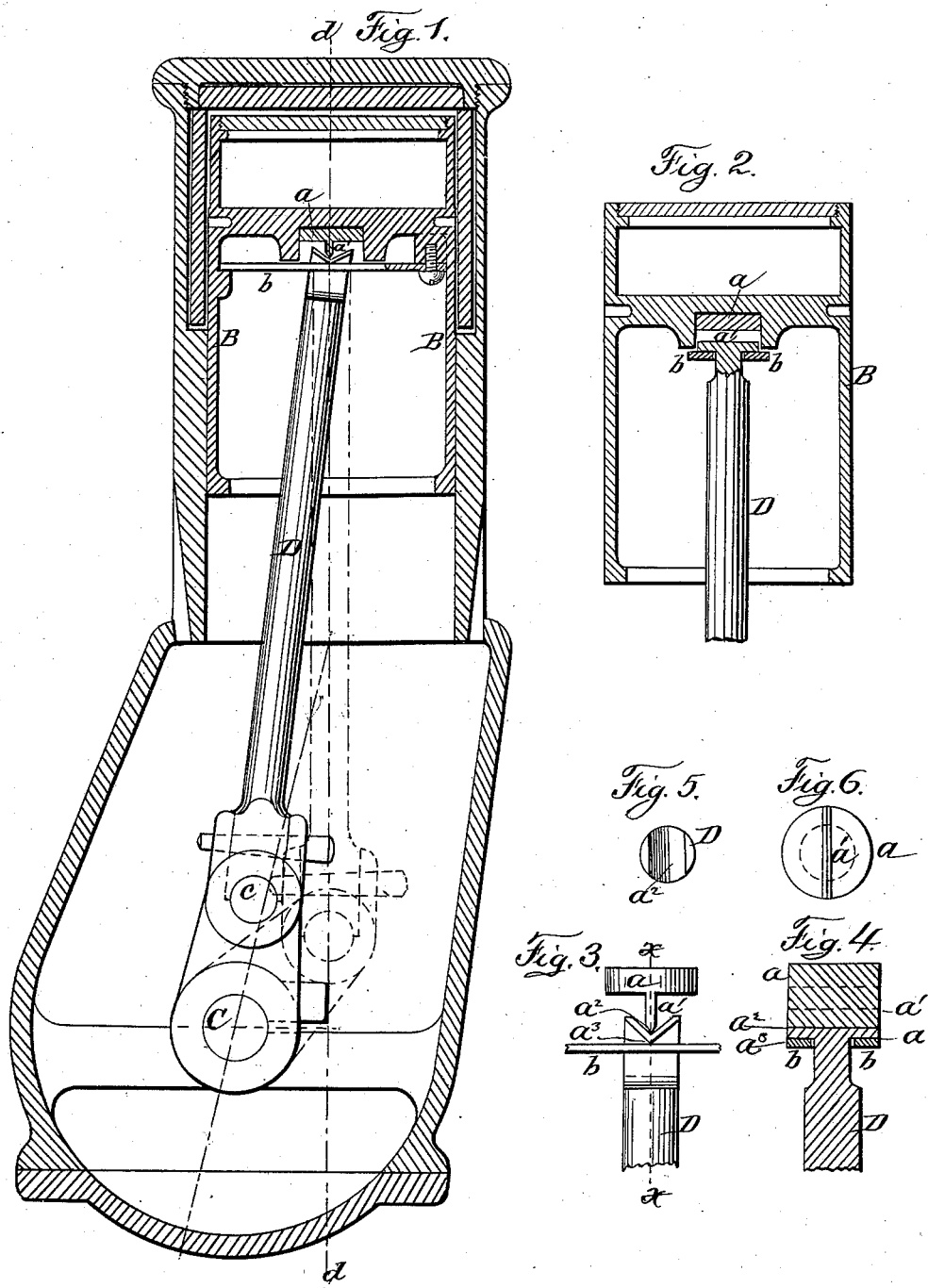

LEWIS HALLOCK NASH, OF BROOKLYN, ASSIGNOR TO THE NATIONAL METER COMPANY, OF NEW YORK, N. Y.

SINGLE-ACTING ENGINE.

SPECIFICATION forming part of Letters Patent No. 312,495, dated February 17, 1885.

Application filed May 2, 1884. (No model.)

*To all whom it may concern:*

Be it known that I, LEWIS HALLOCK NASH, a citizen of the United States, residing at Brooklyn, in the county of Kings and State of New York, have invented new and useful Improvements in Single-Acting Engines, of which the following is a specification.

My invention relates to the piston-connection of single-acting steam or other engines; and the object of my improvement is to reduce the friction of the piston-bearing to a minimum, to avoid the necessity of oiling the bearing-connection of the piston with the piston-rod, and to provide for taking up the wear of the bearing-joint without care or adjustment of the connection, and to reduce the friction of the piston while reducing the friction of its piston-rod bearing to a minimum.

Referring to the accompanying drawings, Figure 1 represents a central section of an engine-cylinder, showing my improved piston-bearing; Fig. 2, a similar section of the piston and its bearing, taken at right angles to Fig. 1; Fig. 3, an enlarged detail of the piston-bearing; Fig. 4, a section taken through the line $x\ x$ of Fig. 3; Fig. 5, an end view of the piston-rod, and Fig. 6 an end view of the knife-edge bearing-piece of the piston.

The cylinder and its valve appliances may be constructed in any suitable manner for what is known as a "trunk-engine," and the piston may have such construction as best adapts it for use with such cylinder.

The piston connecting-rod D has the usual form of bearing upon the crank-pin $c$, but has a peculiar bearing upon the piston B, which I will now describe. A hardened-steel piece, $a$, is seated centrally in a confining-recess in the rear side of the piston, and has formed centrally on its outer side a knife-edge or blade, $a'$, adapted to fit within a V-shaped groove, $a^2$, formed in the end of the connecting-rod. Beneath the groove $a^2$ the connecting-rod is formed with two knife-edge bearings, $a^3\ a^3$, which stand in vertical line with the knife-edge $a'$ of the piston, and project from the opposite sides of the connecting-rod, as shown in the detail view, Figs. 3 and 4. The knife-bearings $a^3$ of the rod D, as shown, are formed by recessing the rod; but they may be formed without such recessing, and the bearing-piece $a$ of the piston may have the groove and connecting-rod D a corresponding knife-edge. The connecting-rod is maintained in proper bearing relation upon said knife-edge bearing $a'$ by means of two plate-springs, $b\ b$, secured to the rear side of the piston in such manner as to stand on either side of the piston-rod D and bear upward upon the side knife-edge, $a^3$, thereof, so that the connecting-rod will rock upon a knife-edge bearing, and thus require no oil, and will not be injured by heat to which it may be exposed. The springs will be under constant pressure, and hence take up any slight wear that may occur, so that this form of bearing will require no attention, and is the form I prefer to use in engines of light power. Such a piston-bearing may be used with a crank-shaft placed in center line with the cylinder; but I prefer to use such knife-edge bearing with a shaft, C, arranged to one side of the center line of the cylinder, whereby side strain on the piston is avoided, so that the friction of the piston and the friction of the piston-bearing are reduced to a minimum.

In Fig. 1 the axial line of the cylinder is indicated by the dotted line $d\ d$, and the crank-shaft has direct connection with the piston-bearing.

The distance to which the crank-shaft is arranged to one side of the center of the axial line of the cylinder is about equal to or approximately equal to one-half the length of the crank from center to center. By this arrangement the downward force exerted by the piston on its downstroke will then, in so far as it varies from the axial line $d\ d$, be distributed about equally on either side of said line $d\ d$, so as to be caused to act with the least possible degree of obliquity to the direction of piston motion, and hence produce the least friction in its motion.

It will be understood that the knife-edge piston-bearing is applicable to engines generally, but is especially applicable to gas-engines in reducing the friction of the moving parts.

I claim—

1. The combination of the cylinder, the piston, and the crank-shaft of a single-acting engine, with a piston-rod having an angular end bearing held freely upon an angular seat of the piston, whereby to reduce friction and to maintain the piston and piston-rod in central relation to each other and to the crank.

2. The combination, in a single-acting engine, with the piston, of the projecting blade or knife-edge $a$, seated centrally in said piston, and the piston-rod having a grooved or V-shaped bearing, $a^2$, adapted to form a bearing with and rock upon the piston-edge bearing, substantially as described.

3. The combination of the piston provided with a knife-edge or blade, $a'$, and the piston-rod having a grooved or V-shaped bearing, $a^2$, and a knife-edge or blade, $a^3$, with means, substantially such as described, whereby said piston-rod is maintained in proper bearing relation with the piston and to compensate for the wear of the bearing.

4. The bearing-connection of the piston and of the piston-rod, consisting of the piston-bearing blade $a'$, the piston-rod D, having a grooved or V-shaped bearing, $a^2$, and the side blades or knife-edges, $a^3$ $a^3$, and the separate springs $b$ $b$, connected with the piston and forming an upward-pressing bearing upon the side knife-edges of the piston-rod, substantially as described.

5. The combination, with the piston having a knife-edge bearing and the piston-rod having a grooved or V-shaped bearing end, of the crank-shaft arranged to one side of the center line of the cylinder, substantially as described, for the purpose specified.

6. The combination, with the cylinder, the piston, and the crank-shaft of a single-acting engine, of a piston-rod having an angular end bearing held freely upon an angular bearing of the piston, and a yielding connection whereby to maintain the contact of the said angular bearings, substantially as herein set forth.

In testimony whereof I have hereunto set my hand in the presence of two subscribing witnesses.

LEWIS HALLOCK NASH.

Witnesses:
H. W. BRINCKERHOFF,
CHRISTOPHER C. WHITTEMORE.